Figure 1:

No. 820,169. PATENTED MAY 8, 1906.
G. VON ARCO.
RESONANCE CIRCUIT.
APPLICATION FILED OCT. 4, 1905.

UNITED STATES PATENT OFFICE.

GEORG VON ARCO, OF BERLIN, GERMANY.

RESONANCE-CIRCUIT.

No. 820,169.      Specification of Letters Patent.      Patented May 8, 1906.

Application filed October 4, 1905. Serial No. 281,318.

*To all whom it may concern:*

Be it known that I, GEORG GRAF VON ARCO, engineer, a subject of the King of Prussia, German Emperor, residing at Berlin, Germany, No. 1ᵇ Karlsbad, have invented certain new and useful Improvements in Resonance-Circuits, of which the following is a full, clear, and exact description, reference being had to the accompanying drawings, forming a part of this specification.

My invention relates to improvements in circuits for oscillatory currents, such as resonance-circuits, and is particularly adapted to wireless-telegraphy circuits; and it has for its object to provide such circuits of an improved character.

Every resonance-circuit, immaterial as to whether the same is excited by more or less damped electromagnetic waves, must oscillate for a long period if a sharp tuning is to be obtained and if at the same time a weakening of the intensity shall not occur, so that the amplitudes by the accumulation of energy through resonance may gradually increase to the desired maximum amplitude. The condition for this is slight losses of the resonance-circuit per oscillation—that is to say, slight losses by ohmic resistance and by eddy-currents. The first losses are obviated by the employment of thick conducting-wires in the resonance-circuit. Very thick wires are, however, not suitable for such resonance-circuits as employed for a receiving-station for spark telegraphy, in view of the fact that the resonance-circuit contains a detector, which may be a granular coherer or an electrolytic cell or the like, and these detectors possess a very small capacity, while coils of thick wire have a very great capacity. By the employment of thick-wire coils in the resonance-circuit a capacity dependent upon the size of the coil is added to the detector capacity, which in the case of the granular coherer produces a decrease of the tension and, for example, in the electrolytic detector an unintentional shunt, so that eventually a limit is reached where every improvement intended to be produced by the employment of thick wires is compensated for by the increased capacity in connection therewith. The increasing constant capacity of the coil decreases the capability of variation of the wave length of a system of this kind. Furthermore, the disadvantage is present that the volume of such coils is considerable and the arrangement of the system not convenient to operate. The second-mentioned losses caused by eddy-currents, which also in the case of thick conducting-wires are found to be disturbing, are in the case of wire stretched straight already somewhat considerable. These losses are, however, increased for a wire wound in a coil, as in this case very strong eddy-currents are produced by the magnetic coil-field.

The subject of the present invention consists in forming a resonance system from these two points of view either to attain maximum intensity in a resonance system of relatively sharp tuning or to attain optionally sharp tuning of a resonance system with a given maximum intensity without hereby coming to a greater capacity of the coil. This is obtained according to the present invention by employing a conducting material for the coil, or for the conductor in the circuit, of relatively small dimensions, while at the same time obtaining the same ohmic resistance as was formerly secured only by conductors of large dimensions. This conducting material consists of a stranded wire—that is, a conductor or wire which is composed of many single wires or strands twisted together and insulated from each other, each strand possessing a very small diameter. This diameter should not exceed 0.2 millimeter. A stranded wire may advantageously be used for this purpose in which the single wires are only 0.1 millimeter in thickness and in which ten to one hundred and eighty such single wires are twisted together. A wire of this description is represented in Figure 1.

In order to obtain very small outer dimensions, the single strands are either insulated from each other by a coating of lacquer or varnish (such as cellose acetate or artificial silk) or by a covering of enamel. The number of the single conductors twisted together depends upon the percentage of the loss which is permissible per oscillation, upon the number of oscillations, upon the capacity of the circuit, and the length of the wire.

Figure 2:
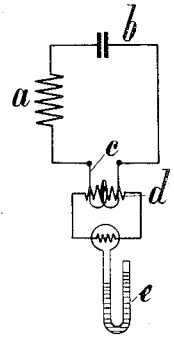

Fig. 2 shows a resonance-circuit composed of a wire formed according to this invention. The resonance-circuit contains a self-induction coil $a$, also composed of a stranded wire formed according to this invention, a tuning-condenser $b$, and also a primary winding $c$, which by means of a secondary winding $d$ imparts the oscillation energy to a known hot-wire ammeter $e$.

Figure 3:
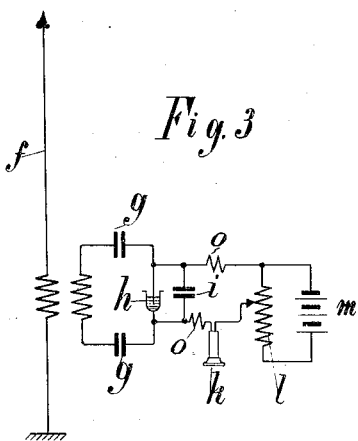

Fig. 3 shows a receiving-station for wireless telegraphy in which the primary coil, located in the earthed receiving-circuit $f$, and also the secondary coil, located in the detector-circuit, consist of a stranded wire formed according to the present invention. The detector-circuit contains, further, the condenser $g$ and the electrolytic detector $h$, to which a large condenser $i$ is connected in parallel. The electrodes of the electrolytic cell are, as shown, connected through the choking-coil $o$ to the current-supply $m$ and with the said current-supply by means of a telephone $k$ and a variable resistance $l$. The arrangement of this resistance in connection with the battery permits of the tension applied to the cell being accurately regulated.

Coils in open and closed oscillation systems with and without spark-gaps and consisting of several insulated separate wires have been employed in order to facilitate coiling and to obtain greater conductivity; but the cross-section, as well as the insulation of the wires, were always considerably greater than would permit of obtaining the advantages secured by the present invention. It was further difficult to wind several single wires so as to give the same uniform self-induction and equal amounts of current which could be conducted through the several single wires.

Having described my invention, what I claim, and desire to secure by Letters Patent, is—

1. A resonance-circuit containing a conductor consisting of a stranded wire composed of a plurality of insulated strands the conductive material of each strand being .2 millimeter or less in diameter, substantially as described.

2. A resonance-circuit containing a conductor consisting of a wire formed of a plurality of strands, the conductive material of each strand being .2 millimeter or less in diameter and each strand being coated with an insulating coating or varnish, substantially as described.

3. A resonance-circuit containing a conductor consisting of a plurality of insulated strands the conductive material of each strand being .2 millimeter or less in diameter and means for perceiving the oscillations in said resonance-circuit, substantially as described.

4. A resonance-circuit containing a self-induction coil, said coil consisting of a conductor composed of a plurality of insulated strands of .2 millimeter or less in diameter and means for perceiving the oscillations in the resonance-circuit, substantially as described.

5. In a receiver for wireless telegraphy, a resonance-circuit containing a conductor consisting of a wire composed of a plurality of insulated strands of .2 millimeter or less in diameter, substantially as described.

6. In a receiver for wireless telegraphy, a resonance-circuit containing a conductor consisting of a wire composed of a plurality of insulated strands of .2 millimeter or less in diameter and a detector for perceiving the oscillations in the circuit substantially as described.

7. In a receiver for wireless telegraphy, a resonance-circuit containing a conductor consisting of a wire composed of a plurality of insulated strands of .2 millimeter or less in diameter, a detector for perceiving the oscillations in said circuit and a condenser in parallel with the detector, substantially as described.

8. In a receiver for wireless telegraphy, a resonance-circuit containing an induction-coil consisting of a wire composed of a plurality of insulated strands of .2 millimeter or less in diameter, a detector for perceiving the oscillations in said circuit and a condenser in parallel with the detector, substantially as described.

In witness whereof I hereunto subscribe my name this 20th day of September, A. D. 1905.

GEORG VON ARCO.

Witnesses:
 WOLDEMAR HAUPT,
 HENRY HASPER.